Nov. 10, 1964 — R. A. WEST — 3,156,853
ELECTRICAL CAPACITOR WITH AN IMPREGNATED OXIDE LAYER
Filed Sept. 13, 1961
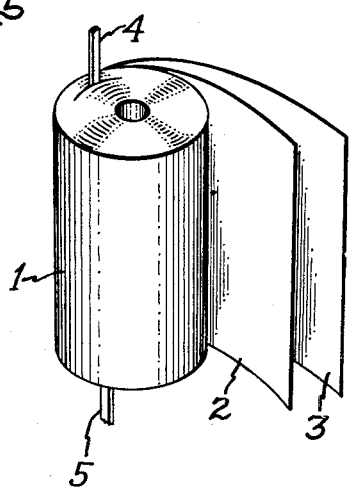
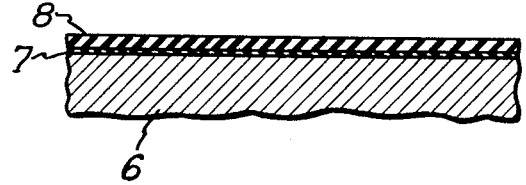
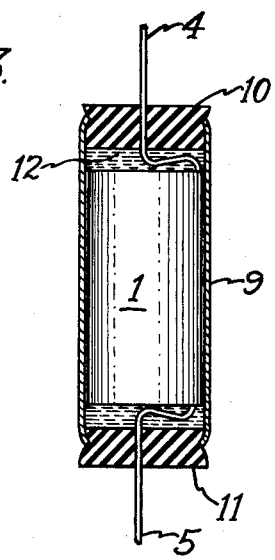
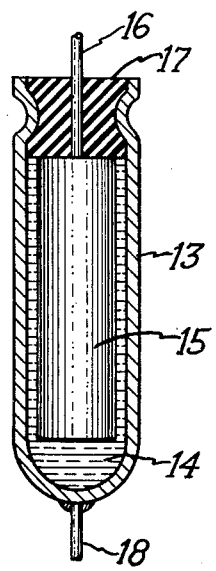
Inventor,
Robert A. West,
by Sidney Greenberg
His Attorney.

United States Patent Office 3,156,853
Patented Nov. 10, 1964

3,156,853
ELECTRICAL CAPACITOR WITH AN
IMPREGNATED OXIDE LAYER
Robert A. West, Hudson Falls, N.Y., assignor to General
Electric Company, a corporation of New York
Filed Sept. 13, 1961, Ser. No. 137,905
8 Claims. (Cl. 317—258)

The present invention relates to electrical capacitors, and more particularly to electrical capacitors of the type having film-forming electrodes.

Conventional electrolytic capacitors are made with a pair of aluminum electrode foils, one or both of which have a dielectric oxide film, formed thereon by anodizing the foil in a suitable forming electrolyte such as a boric acid solution. The electrode foils are usually wound into rolled form with porous spacer material between them, the wound foil assembly being immersed in a casing containing a conducting electrolyte which impregnates the spacer material. The spacer material is commonly composed of cellulosic paper and occupies as much as 50% of the capacitor volume. The presence of the spacer material thus markedly increases the size of the capacitor, and correspondingly reduces the capacitance-to-volume ratio, and in addition results in such disadvantages as increased impedance and dissipation factor, as well as less desirable low temperature characteristics. It has usually been considered necessary to employ such spacer material to afford a sufficiently high breakdown voltage in the capacitor.

It is an object of the invention to provide an electrical capacitor having high capacitance per unit volume coupled with low power factor and which is adapted for use under conditions of relatively high voltage and temperature.

It is another object of the invention to provide an electrical capacitor of the above type which dispenses with the need for spacer material such as employed heretofore by the prior art.

Other objects and advantages will become apparent from the following description and appended claims.

With the above objects in view, the present invention relates to an electrical capacitor comprising a pair of electrode members one of which is composed of aluminum having formed on its surface a dense anodic dielectric film and a porous anodic dielectric film overlying the dense anodic dielectric film, the anodized electrode members being separated solely by material having a resistivity of about $5 \times 10^5$ to about $3 \times 10^7$ ohm-cms. at 25° C.

The invention will be better understood from the following description taken in conjunction with the accompanying drawing, in which:

FIGURE 1 shows a partially unrolled capacitor section which may be employed in accordance with the invention;

FIGURE 2 is a cross-sectional diagrammatic view of a portion of a film-formed aluminum electrode employed in accordance with the invention;

FIGURE 3 shows the capacitor section of FIGURE 1 assembled in a completed capacitor unit;

FIGURE 4 is a partly sectional view of another type of capacitor in which the invention may be involved;

Figure 5:
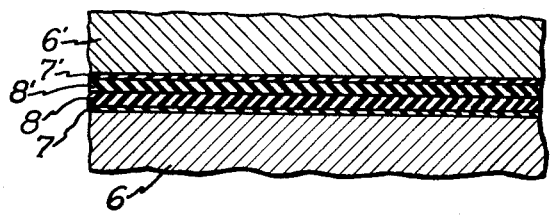
FIGURE 5 is a view similar to that of FIG. 2 showing superimposed film-formed aluminum electrodes of the invention.

Referring now to the drawings and particularly to FIGURE 1, there is shown a capacitor section 1 comprising a pair of superimposed aluminum electrode foils 2 and 3 convolutely wound into a roll without any separate spacer material therebetween. The surfaces of one or both aluminum foils 2 and 3 are provided with anodically-formed films (see FIGURE 2), as more fully described hereinafter, which serve as a dielectric barrier film and as a separating and protective layer. Terminal leads 4 and 5 extending from opposite sides of roll 1 are respectively connected to foils 2 and 3.

FIGURE 2 shows in greater detail the structure of the aluminum electrode with films formed thereon, the aluminum electrode base 6 having anodically formed thereon an aluminum oxide dielectric film 7 which is thin and relatively dense, and a second anodically formed aluminum oxide film 8 which is relatively thick and porous overlying the dense anodic film 7. It will be understood that in practice normally both surfaces of the foil electrode would have anodic films formed thereon.

In a polar-type capacitor, one of the aluminum foils (the cathode) will have formed thereon only a porous type of oxide film as described hereinafter, while the other foil (the anode) will have both the dense type and the porous type dielectric films thereon. In a non-polar capacitor, each of the foils will have both types of films thereon.

The thicknesses of the layers of the film-formed electrode as shown in FIGURE 2 are shown in exaggerated scale for the purposes of clarity, and the relative dimensions as shown are not necessarily those used in practice. In a practical device, the thicknesses of the various parts may typically be as follows: electrode foil 6, 2 mils; thin dielectric film 7, .2 micron; thick porous oxide film 8, 2 microns. Oxide film 7 is typically formed by known methods such as by anodizing the foil in a solution of a relatively weak acid as, for example, boric acid, or such other known film-forming electrolytes that have little or no solvent action on the formed film. The thickness of the dense barrier type layer 7 principally determines the capacitance of the capacitor. Porous oxide layer 8, on the other hand, is formed by known methods of anodizing in a solution of a relatively strong acid, for example, oxalic acid, phosphoric acid, chromic acid, or sulfuric acid, or other strong acids in which the anodic aluminum oxide film is somewhat soluble. In practice, the porous oxide layer 8 is initially formed on aluminum base 6, and thereafter the dense anodic film 7 is formed, the dense layer in the anodizing process building up underneath porous oxide film 8.

FIGURE 3 shows capacitor roll 1 arranged in operative assembly in a casing 9 which may be of metal or any other suitable material and which is fluid-tightly sealed at opposite ends by insulating seal plugs 10 and 11 with leads 4 and 5 extending therethrough. In accordance with the invention, capacitor roll section 1 is immersed in a liquid 12 contained in the casing, the liquid having a resistivity in the range of about $5 \times 10^5$ to $3 \times 10^7$ ohms-centimeters at 25° C. Liquid 12 is hereinafter designated as a "semiconducting" material, the quoted expression being used in the sense that the material is intermediate a conductor and an insulator.

FIGURE 4 shows another type of capacitor in which the invention may be embodied, this embodiment comprising a casing 13 of any suitable conductive material such as silver, copper, tantalum, aluminum, lead, or other metallic or conductive materials, the casing serving as a cathode and containing a semi-conducting liquid 14 such as above-described. Electrode 15 serving as the anode is made of the structure illustrated in FIGURE 2. In the capacitor assembly, anode lead 16 extends through insulating sealing plug 17 around which casing 13 is crimped or otherwise secured in fluid-tight relation. Cathode lead 18 is joined by welding or any other suitable means to casing 13 as shown.

FIGURE 5 shows in diagrammatic fragmentary form the arrangement of the film-formed electrodes in relation to one another as assembled in the device illustrated in FIGURE 3. As shown, the electrodes are adjacent one another with their respective porous oxide layers 8, 8' in direct contact. Semi-conducting liquid 12 shown in FIGURE 3 impregnates porous oxide layers 8, 8' and the interface therebetween and thus serves as a conducting bridge between dense anodic oxide layers 7, 7' of the respective electrode foils 6, 6', while porous oxide layers 8, 8' serve as physical separators between the electrode foils. An advantage of this structure is that not only is any air space eliminated between the two foils which might reduce the capacitance, but also the effective capacitance is thereby determined by the very thin oxide layers 7, 7' and not by the relatively thicker porous oxide layers 8, 8'. In effect, the liquid impregnated layers 8, 8' constitute a composite separator-conductor combination which simultaneously serves two different functions while occupying the same spatial region. In this way, a separate spacer material such as heretofore used in electrolytic capacitors is entirely dispensed with, with the consequent avoidance of the poor space factor, increased power factor and limited thermal resistance normally attendant on the use of such spacer material.

The following table shows examples of compositions in percent by weight which may be employed as the semi-conducting material of the invention, and capacitance, resistivity and dissipation factor (power factor) data obtained in tests made thereon:

*Table I*

| Example | Resistivity, Ohm-cm. | Capacitance, mfd./in.$^2$ | Percent Dissipation Factor |
|---|---|---|---|
| 1. Ethylene glycol | $4\times10^6$ | .146 | 2.57 |
| 2. Ethylene glycol plus trace of phosphoric acid | $5\times10^5$ | .144 | 3.3 |
| 3. Ethylene glycol, 95%; Boric Acid, 5% | $1\times10^6$ | .143 | 3.5 |
| 4. Glycerol | $1.9\times10^7$ | .140 | 13.0 |
| 5. Cresol | $7\times10^6$ | .140 | 5.5 |
| 6. Cresol, 98%; Butyl acid phosphate, 2% | $1\times10^6$ | .144 | 5.2 |
| 7. Diethylene glycol | $2.5\times10^6$ | .140 | 4.6 |
| 8. Polyethylene glycol (200-600) | $1.7-8.5\times10^6$ | .145 | 5-8 |
| 9. Polyethylene glycol, 200-50%; Polyethylene glycol, 1,000-50% | $3\times10^7$ | .153 | 6.1 |

It will be understood that the foregoing compositions are given only by way of example, since it will be apparent to those skilled in the art that semi-conducting materials of the desired resistivity may be composed of a wide variety of other compositions. For example, acids such as sulfuric, chromic, nitric and the like could be added to certain of the above compounds to alter their resistivity characteristics.

All of the compositions in the above table were liquid at room temperature except that of Example 9 which was a solid and which was therefore introduced into the test capacitor while hot and in liquid form.

Figure 6:
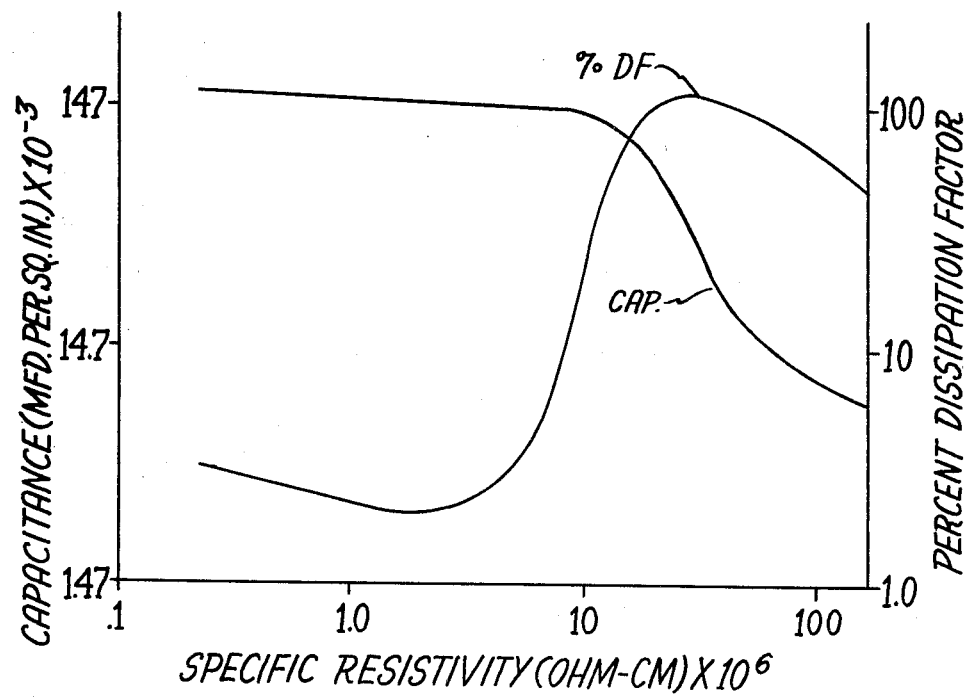
FIGURE 6 graphically illustrates electrical properties of capacitors made in accordance with the invention.

FIGURE 6 graphically illustrates the capacitance and dissipation factor of capacitor units employing semi-conducting liquids as above-described, the curves shown being a composite of data obtained with semi-conducting liquids of different resistivity. In the graph, resistivity values are shown as the abscissa in relation to capacitance and percent dissipation factor shown as ordinates, the values being plotted on logarithmic scale. Compositions on which the curves are based for resistivities higher than about $3\times10^7$ were those consisting of cresol having small amounts of tricresyl phosphate added thereto, the resistivity increasing with increased amounts of the latter.

From the curves it is evident that the minimum power factor is obtained with maximum capacitance when the semi-conducting liquid has a resistivity of between about $5\times10^5$ and about $8\times10^6$ ohm-cm. Solid semi-conducting material as shown by Example 9 appears to differ somewhat from the liquids represented by the graph in that resistivities of such solid material higher than the aforementioned optimum range of liquid resistivities still are characterized by comparatively low power factor. Hence, from an over-all standpoint including solid semi-conducting material, the upper limit of optimum resistivity for the purposes of the invention is about $3\times10^7$ ohm-cm. While it appears that sufficiently low power factor is obtained at resistivities less than $5\times10^5$ ohm-cm., such resistivities are not of advantage for the purposes of the invention because the breakdown voltage correspondingly decreases, whereas at the higher resistivities the breakdown voltage increases.

Tests made on capacitors constructed in accordance with the invention have demonstrated that the units will operate satisfactorily under voltages up to at least 200 volts, using porous oxide layers 8, 8' of about 2 microns thick. To adapt the units for even higher voltages, it would only be necessary to provide thicker porous layers.

Additional tests were made on capacitors of the same construction as the examples above-described except that a conventional electrolyte was used, composed of 19% ammonium pentaborate in ethylene glycol and having a resistivity of 1000 ohm-cm. These units had a capacitance of about .124 mfd., but their power factor was about 9%, which is considerably higher than that of the above-described units.

In a typical process which may be used in practicing the invention, two 2-mil thick aluminum foils with leads crimped on were subjected to a conventional film-forming process by electrolytically anodizing the foils in an aqueous 3% oxalic acid solution to produce anodic porous oxide films of 2 to 4 microns thickness using a current density of 60 and 120 coulombs/in.$^2$ respectively. The foils were then anodized in conventional manner in an aqueous 10% boric acid electrolyte at 200 volts, forming dense oxide films about .2 microns thick. The foils were superposed without any separate spacer material therebetween and convolutely wound to form a capacitor roll section. The roll section was placed in a casing which was then filled with a semi-conducting liquid of the invention and sealed with the respective leads projecting from the casing.

It has been found that further decrease in power factor, e.g., to as low as 1.35%, may be achieved by cleaning the foils prior to film formation, such as by immersing the foils in a mixture of phosphoric acid and nitric acid.

There is thus provided by the invention an electrical capacitor which dispenses with the need for the conventional separate spacer component, which is accordingly markedly reduced in volume for the same capacitance and has a desirable combination of high capacitance with low power factor, which is adapted for high voltage and elevated temperature conditions, and which may be made by considerably simpler and more economical methods than heretofore conventionally employed in the prior art.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical capacitor comprising a pair of electrodes, at least one of said electrodes being composed of aluminum and having a first dense anodic oxide dielectric layer overlying the surface of said one electrode and a second porous anodic dielectric layer overlying said dense dielectric layer, and a semi-conducting material having a resistivity between about $5\times10^5$ and about $3\times10^7$ ohm-cm. impregnating said porous dielectric layer.

2. An electrical capacitor comprising a pair of electrodes, at least one of said electrodes being composed of aluminum and having a first dense anodic oxide dielectric layer overlying the surface of said one electrode and a second porous anodic dielectric layer many times thicker than said first anodic layer overlying said dense dielectric layer, and a semi-conducting material having a resistivity between about $5 \times 10^5$ and about $3 \times 10^7$ ohm-cm. impregnating said porous dielectric layer, said one electrode being separated from the other electrode solely by the semi-conducting material and the anodic dielectric layers of at least said one electrode.

3. An electrical capacitor comprising a pair of convolutely wound foil electrodes, at least one of said electrodes being composed of aluminum and having a first dense anodic oxide dielectric layer overlying the surface of said one electrode and a second porous anodic dielectric layer many times thicker than said first anodic layer overlying the latter layer, and a semi-conducting material having a resistivity between about $5 \times 10^5$ and about $3 \times 10^7$ ohm-cm. impregnating said porous dielectric layer, said one electrode being separated from the other electrode solely by the semi-conducting material and the anodic dielectric layers of at least said one electrode.

4. An electrical capacitor comprising a pair of convolutely wound foil electrodes, each of said electrodes being composed of an aluminum layer having a first dense anodic oxide dielectric layer overlying the surface of said one electrode and a second porous anodic dielectric layer many times thicker than said first anodic layer overlying the latter layer, and a semi-conducting material having a resistivity between about $5 \times 10^5$ and about $3 \times 10^7$ ohm-cm. impregnating said porous dielectric layer, said electrodes being in contact with one another and said aluminum layers being separated from each other solely by the semi-conducting material and the anodic dielectric layers.

5. An electrical capacitor comprising a pair of electrodes, at least one of said electrodes being composed of aluminum and having a first dense anodic oxide dielectric layer overlying the surface of said one electrode and a second porous anodic dielectric layer overlying said dense dielectric layer, and a semi-conducting material having a restivity between about $5 \times 10^5$ and about $8 \times 10^6$ ohm-cm. impregnating said porous dielectric layer.

6. An electrical capacitor comprising a pair of electrodes, at least one of said electrodes being composed of aluminum and having a first dense anodic oxide dielectric layer overlying the surface of said one electrode and a second porous anodic dielectric layer overlying said dense dielectric layer, and a semi-conducting nonaqueous organic liquid having a resistivity between about $5 \times 10^5$ and about $8 \times 10^6$ ohm-cm. impregnating said porous dielectric layer.

7. An electrical capacitor comprising a pair of electrodes, at least one of said electrodes being composed of aluminum and having a first dense anodic oxide dielectric layer overlying the surface of said one electrode and a second porous anodic dielectric layer overlying said dense dielectric layer, and a semi-conducting material composed of an organic solid having a resistivity between about $5 \times 10^5$ and about $3 \times 10^7$ ohm-cm. impregnating said porous dielectric layer.

8. An electrical capacitor comprising a casing, a pair of electrodes in said casing, each of said electrodes being composed of an aluminum layer having a first dense anodic oxide dielectric layer overlying the surface of said one electrode and a second porous anodic dielectric layer overlying said dense dielectric layer, and a semi-conducting liquid in said casing impregnating said porous dielectric layers and having a resistivity of about $5 \times 10^5$ to about $8 \times 10^6$, said electrodes being in contact with one another and said aluminum layers being separated from each other solely by the semi-conducting liquid and the anodic dielectric layers.

References Cited by the Examiner
UNITED STATES PATENTS

| | | | |
|---|---|---|---|
| 2,759,132 | 8/56 | Ross | 317—230 |
| 2,866,139 | 12/58 | Ross | 317—230 |
| 2,930,951 | 3/60 | Burger et al. | 317—242 |
| 2,934,682 | 4/60 | Schwarz et al. | 317—230 |
| 3,025,441 | 3/62 | West | 317—258 |
| 3,067,367 | 12/62 | Ross | 317—230 |

JOHN F. BURNS, *Primary Examiner.*